Patented Feb. 8, 1938

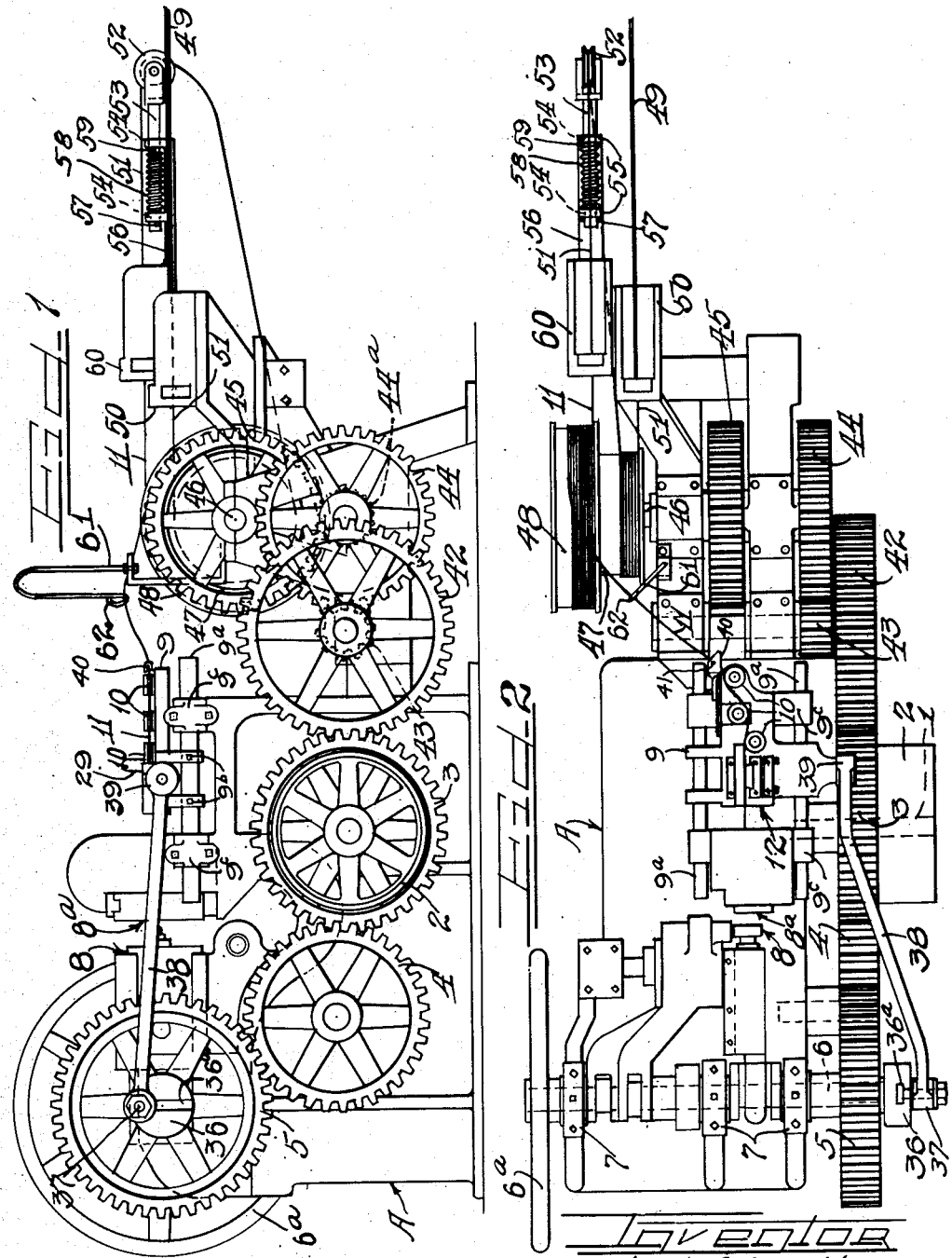

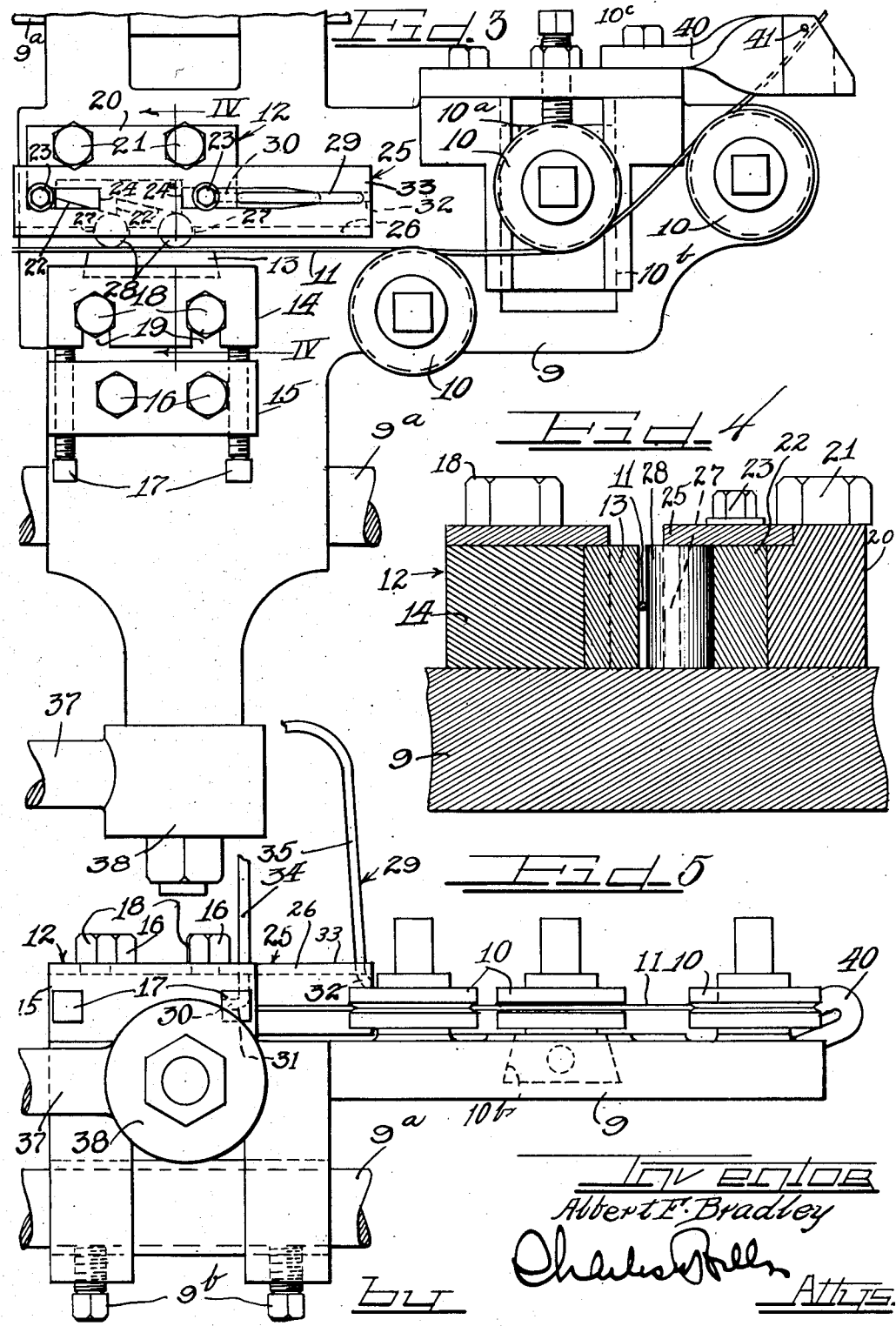

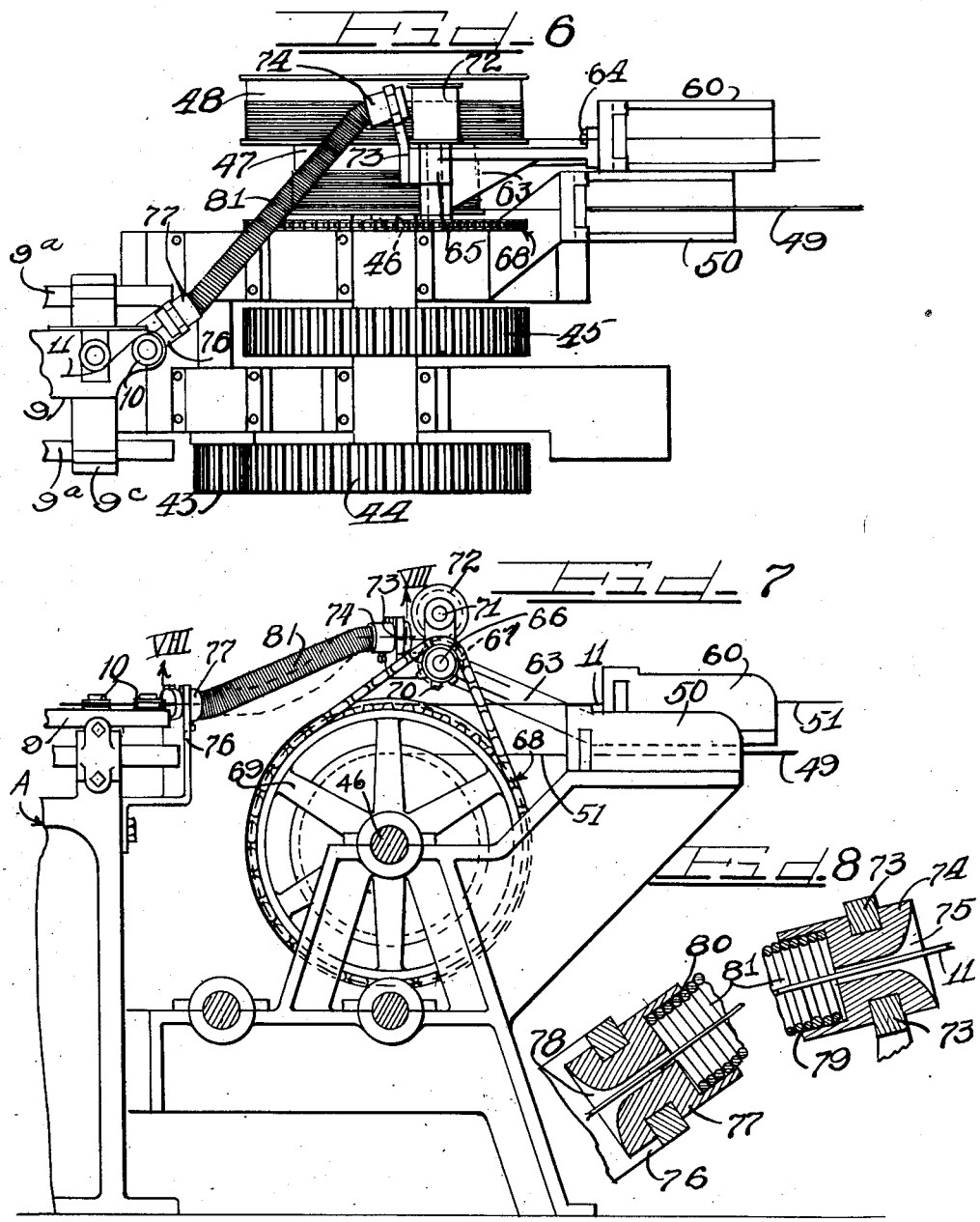

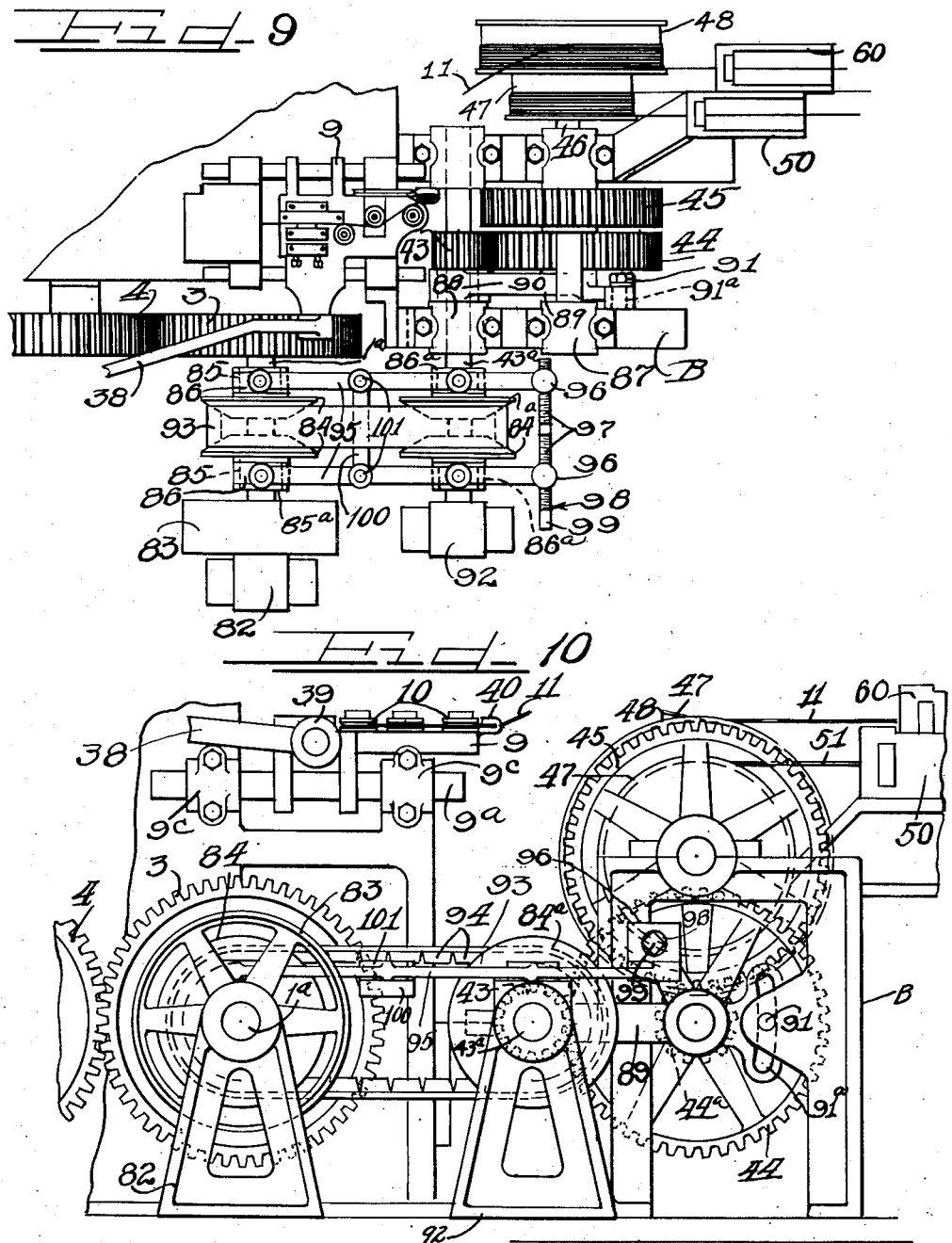

2,107,745

UNITED STATES PATENT OFFICE 2,107,745

APPARATUS FOR MAKING WIRE PRODUCTS

Albert F. Bradley, Sterling, Ill., assignor to Northwestern Barb Wire Company, Sterling, Ill., a corporation of Illinois Application July 19, 1934, Serial No. 735,927

24 Claims. (Cl. 29—33)

This invention has to do with the art of processing wire products.

In the past, wire article and processing has involved the purchase of wire on reels or the provision of a special plant or department with wire drawing facilities, wherein the wire has been drawn by one or more operations to the desired size and wound on reels which have been thereafter carried to another department affording the wire fabricating or other processing machine. Thereafter the reels have been mounted in position to cooperate with the desired processing machine. In the case where the reels have been purchased, the manufacturer has had to bear the expense of reeling and shipping the wire. It has also been necessary to unpack the reel, carry it to the processing machine and mount it in position to feed the wire to the machine. Considerable time has also been lost because of the necessity for stopping the processing machine to replace a reel from which the wire has been entirely withdrawn by a new drum or reel of wire.

In the case of a manufacturer who has had the wire drawn to size in another department of his plant, the wire has been wound on reels as before stated and these reels have been carried to the part of the plant where the processing machines were located, resulting in the loss of time in carrying the reels as well as the loss of time resulting from the replacement of used reels by new reels. In addition, time has been lost at the wire drawing machine because of the necessity for replacing "full" reels by "empty" reels to receive additional drawn wire. Moreover, it has been necessary to employ one or more operators for each drawing machine and a different operator or attendant for the wire processing machine. Also, the separate drive mechanisms for the drawing machines and the processing machines have involved considerable duplication of effort and machinery, and this is true also of the separate mechanisms for drawing, feeding and processing the wire.

Due, moreover, to the looseness of the wire on the reel, it often becomes tangled, resulting in insufficient feed and hence in spoiled articles, as well as requiring time for disentangling the wire, thereby reducing output.

The present invention has for its objects to overcome these and other shortcomings by the provision of a combined wire drawing and processing mechanism, affording a drive whereby the wire is continuously drawn, fed to and operated upon by the processing mechanism, the feed to the processing mechanism involving substantially no interruption. The space, power and number of attendants required is considerably reduced over what has heretofore been necessary, so that the total cost of manufacture of the articles is very substantially reduced and the rate of manufacture is considerably increased.

The invention involves the provision of co-operating simultaneously operating stepped wire drawing drums with means for compensating for variations in feed of the wire in the drawing mechanism due to wear of dies and other parts, and to provide proper tension of the wire between the drums.

Another object of the invention is to provide means for preventing kinking of the wire between the last drawing drum and an intermittent feed for the wire to the processing mechanism.

It is also an object of the invention to take advantage of the heat in the wire resulting from the drawing operation to render the wire more readily yieldable to fabricating operations and also to reduce the amount of heating necessary thereafter in the event the wire product is to be annealed.

A further object of the invention resides in the provision of means affording synchronous operation of wire drawing, processing and intervening feeding mechanism whereby the same after being stopped may be again started without adjustment of any part, merely by applying the motive power.

In accordance with the general features of the invention, the rod stock is mounted in coil bundles on a rack and adjacent ends welded so as to enable the stock to be fed to the drawing mechanism without interruption. The stock is drawn through a die and passes about a drum, then about a tension device, and thence through a second die and about a second drum which may be co-axial with the first drum. The number of drums, dies and tension devices may be varied, two dies having been found satisfactory for a certain size of wire desired to be processed. The wire from the second drum may be fed continuously as in the manufacture of fencing, bale ties and other products, or it may be fed intermittently as in the manufacture of nails and the like.

In an intermittent feed, the rate of drawing is predetermined so that sufficient slack for an entire feed stroke is afforded. In the manufacture of nails, for example, the feed may be extremely rapid, the fabricating device sometimes turning out as many as 400 nails per minute. The invention provides a slack take-up device which prevents undue whipping of the slack wire to be fed and also maintains a proper degree of tension between the last drum and the feeder and is arranged to prevent kinking of the wire during the return stroke of the feeder and to insure against slippage of the wire about the last drum.

The tension between the parts also prevents tangling of the wire on the drums.

Further objects and advantages of the invention will appear as the description proceeds.

This invention (in a preferred form) is illustrated in the drawings and hereinafter more fully described.

On the drawings:

Figure 1 is a side elevational view of one form of the invention.

Figure 2 is a plan view of Figure 1.

Figure 3 is an enlarged fragmentary plan view showing details of the feeding device.

Figure 4 is a sectional view taken substantially in the plane IV—IV of Figure 3.

Figure 5 is a fragmentary elevational view of the structure shown in Figure 3.

Figure 6 is a fragmentary plan view showing a modified form of slack take-up means for the wire leaving the last drawing drum.

Figure 7 is an elevation of the structure appearing in Figure 6.

Figure 8 is a broken enlarged sectional view taken substantially as indicated by the line VIII—VIII in Figure 7.

Figure 9 is a fragmentary plan view showing a modified drive affording variable speeds for the drawing and fabricating mechanisms.

Figure 10 is a fragmentary elevational view of the structure appearing in Figure 9.

Referring now more particularly to the drawings, the illustrated embodiment of the invention affords a framework A for the apparatus as a whole for resting on a floor or other support and provides bearings for a main drive shaft 1 carrying a pulley 2 driven by belt from a suitable source of power. Suitable means on the countershaft (not shown) may be provided to stop the belt at will, or if desired tight and loose pulleys could be provided on the shaft 1. The shaft 1 carries a driving gear 3 which, through an idler gear 4, operates a driven gear 5 mounted on a crank shaft 6 and journalled in bearings 7. The shaft 6 preferably carries a flywheel 6a and is provided with eccentrics for operating the heading mechanism shown generally at 8 by means of which the forward end of the nail is headed as is well known in nail manufacture and needs no elaboration here. Adjacent and operatively associated with the heading mechanism is a pointing die mechanism 8a for cutting and forming the point at the rear end of the nail, as is well known in nail manufacture and need not be dwelt upon further. A suitable drive (not shown) is provided for these mechanisms as is also well known in nail making machines, provision (not shown) being also made for the ejection of the finished nails to make way for the nails to be fabricated.

The frame A also carries a suitable feed table 9 stationarily held in adjusted position on rails 9a as by screws 9b and slidable in bearings 9c and provided with guide rollers 10 which the nail wire 11 engages before entering the fabricating instrumentalities. The table 9 carries a wire gripping and feeding roller clutch designated generally at 12. This structure includes an anvil 13 arranged to engage the wire 11 at one side and carried by a block 14.

A second block 15 is secured at 16 to the table 9 and carries adjusting bolts 17 arranged to abut the block 14. The tightening elements 18 fitting in the slots 19 in the block 14 hold the latter in the desired position of adjustment.

Also carried by the table 9 is a block 20 held in place at 21. The block 20 is provided with a member affording one or more roller clutch cams 22 facing the side of the wire opposite the anvil 13, and with guide pins 23 extending through slots 24 and 24a in a slidable angle bar 25 fitted in a rabbet in the block 20 so that the heads of the studs 21 overlie the same.

The vertical wall 26 of the bar 25 is provided with rectangular openings 27 for receiving and guiding clutch rollers 28. The rollers 28 are arranged to engage the wire 11 on the side opposite the anvil 13, at the same time engaging the wedging cams 22 at points intermediate the ends thereof as shown, so that the rollers cannot escape.

A spring 29 is arranged with its ends extending through the rear slot 24a and has its forward end bent forwardly at 30 and anchored in a recess 31 in the cam block 20, and its other end bent rearwardly at 32 under the horizontal side 33 of the sliding bar 25. The spring arms 34 and 35 are under compression and hence the rear arm 35 exerts a rearward pull upon the bar 25 and consequently upon the rollers 28, causing the latter to be wedged between the cams 22 and wire 11 when the table 9 moves forwardly. When the table 9 moves rearwardly, the wire 11 is held stationary by the fabricating mechanism, causing the spring 29 to yield and the rollers to move to deeper portions of the cams 22 so that the rollers slip rearwardly by the wire 11.

Any other suitable clutching or gripping feed means may be employed.

The shaft 6 carries a slotted plate 36 receiving one end 37 of a pitman 38 pivotally connected at its other end 39 to the table 9 which thus is operatively similar to a crosshead. As the shaft 6 rotates, the plate 36 causes the pitman 38 and hence the table 9 to reciprocate, the roller clutch mechanism gripping the wire 11 and feeding the same to the fabricating devices 8 and 8a during the forward or feed stroke, at the conclusion of which the devices 8 and 8a operate upon the wire thus fed, and being released from the wire during the rear or return stroke while the said devices are in operation.

The table 9 at the rear of the rearmost guide roll or sheave 10 is provided with a device 40 having a pin 41 which guides the wire 11 to said sheave.

The gear 3 on the main drive shaft 1 also meshes with a gear 42 with which is drivably connected a pinion 43 meshing with another gear 44 to which is drivably connected another pinion 44a meshing with the driven gear 45 on a shaft 46 providing a reduced drive from the gear 3 to the gear 45. The shaft 46 is extended and carries stepped wire drawing drums 47 and 48.

The material to be drawn is conveniently in the form of hot rolled rod stock which may be supplied in coil bundles. One or more of these are supported in a rack (not shown), preferably vertically, and at any time prior to consumption of an entire bundle by the wire drawing mechanism about to be described, the unused end of the bundle is welded to an end of another bundle, and the burr removed. Thus the drawing, feeding and fabricating mechanism may operate as long as desired without interruption, as far as the rod stock is concerned.

The reduction in size of the rod stock may be such as to require one or a plurality of drawing operations.

In the illustrated embodiment of the invention, two drawing operations are employed. The stock 49 is drawn through a first and larger die 50 carried by the frame A at the rear of the first and smaller drawing drum 47, and thereby a strand 51 of reduced thickness is formed. The strand 51 extends preferably horizontally into substantial tangency with the smaller drum 47, whose axis is preferably horizontal, and encircles the same preferably a plurality of times to insure proper tension of the strand between the drum 47 and the die 50.

The strand 51 then extends away from the drum 47 and passes about a sheave 52 rotatably carried by a rod 53. This rod is preferably formed to be slidably and non-rotatably received in the openings 54 in spaced lugs 55 of a supporting bracket 56 carried by the frame A. The rod 53 has an abutment 57 to engage the forward lug 55, carries a spring 58 between the lugs, and has an abutment 59 between the spring 58 and the rear lug 55. Thus a forward pull on the sheave 52 will result in compression of the spring 58 between the forward lug 55 and the rear abutment 59. The function of this structure will appear presently.

From the sheave 52 the strand 51 enters the second and smaller die 60 and is reduced thereby to the size, designated 11, to be used in the fabrication of the wire products. The wire 11 extends substantially horizontally from the second die 60 into tangency with the larger drum 48, is wound around the same preferably a plurality of times and then extends forward from the drum 48.

The parts are so dimensioned that the volume of wire leaving the larger die 50 and hence the smaller drum 47 should be equal to the volume of wire issuing from the smaller die 60 and wound about the larger drum 48. That is, the product of the circumference of the pitch helix of 360° of the strand 51 wound about the smaller drum 47 and the area of the opening in the larger die 50 should be equal to the product of the circumference of the pitch helix of 360° of the wire 11 wound about the larger drum and the area of the opening in the smaller die 60.

Practically, due to wear of the parts, the smaller drum is so dimensioned as to draw a slightly greater amount of wire than the larger drum is initially set to draw. Thus a slight excess in wire between the smaller drum and smaller die occurs, and when this takes place, there is insufficient tension on the wire around the smaller drum so that the latter slips in the wire until the larger drum pulls the wire taut, enabling the smaller drum again to draw and cause the wire to slack. This take-up of the slack by the larger drum is sufficiently quick to jolt the parts between the smaller die and smaller drum and cause undesirable strain in the wire, and the jolts would be repeated incessantly, unless some provision were made for their prevention.

To this end, the wire from the smaller drum to the smaller die is passed about the sheave 52 which is spring pressed in a direction to tension the wire. As long as the sheave can move rearwardly, that is, away from the drums, the spring 58 causes the sheave to take up the excess and properly tension the wire from the smaller drum. When the sheave reaches a limit beyond which it cannot be moved rearwardly by the spring, slack in the wire will build up. As soon as any appreciable slack occurs, there will be insufficient tension on the wire around the smaller drum, and this wire then slips around the drum so that the latter fails to draw from the larger die. The larger drum continues however to draw wire from the smaller die, and when the aforesaid slack occurs, the larger drum exerts a quick pull on the slack wire, taking up the slack therein. No jolt occurs, however, because this pull is transmitted directly through the sheave to the spring which acts as a shock absorber. The tension is thereby restored in the wire about the smaller drum so that said wire does not slip, and the smaller drum again draws wire from the larger die. Slack will not then occur again until after the sheave has reached the limit of its movement in the direction of the wire, when the jerk of the slack by the larger drum is again absorbed by the spring.

This cycle may be repeated substantially for some time, but due to the wear of the wire on the dies, there results a slight change in the relationship referred to. For example, the smaller die 60 is subject to substantially greater wear than the larger die 50 because of the greater footage of the wire through the former, and because the area of the openings increases directly as the square of their diameters, so that even were the diametral wear the same for both dies, the increase in area of the opening in the smaller die would be proportionately greater than that of the opening in the larger die. When such wear occurs, the quantity of wire drawn by the larger drum 48 tends to exceed the quantity unreeled by the smaller drum 47. If under such circumstances no provision for slack such as above described between the smaller drum 47 and the smaller die 60 were made, the tension in the wire would be so great that it would break.

The sheave 52 is however arranged to slide a considerable distance in a direction forwardly, i. e., away from the wire engaging the same, and is also arranged to slide in said direction a distance of only one half the excess wire drawn through the enlarged smaller die. The excessive increase in size of the smaller die will of course be so gradual as to become appreciable only after a very long period of use. In the event the smaller die becomes too large, or the excess draw from the smaller die ultimately causes the sheave to reach its limit of forward movement, the smaller die may be readily replaced by a die of the proper size.

The sheave 52 and associated structure thereby serves to compensate for any disturbance in the proper operative relation of the parts enabling the larger drum 48 to feed the wire steadily without slip. Thus the sheave 52 and associated structure is continuously operative to establish a "balance" between the drums, compensating entirely or substantially so for dimensional variations of the dies due to wear from the wire or other causes.

Inasmuch as in the illustrated form of the invention the feed of the wire to the fabricating mechanism is intermittent, provision for slack in the wire between the last drawing drum 48 and the fabricating mechanism is made so that the slack or a portion thereof may be used to provide wire for the feeding stroke so that there may be no insufficiency of wire to be fed when the feeding table 9 moves in its forward stroke. This is due to the fact that the drawing and feeding mechanisms are so synchronized that the wire 11 is drawn from the last die mechanism 60 at the same ultimate rate at which the wire is fed to and consumed by the fabricating mechanism, said wire being drawn from the die mechanism 60 continuously and uninterruptedly whereas the feed of the wire to the fabricating mechanism is intermittent. Thus while the table 9 is moving to the rear or right as shown in Figures 1 and 2, wire is continuously being drawn from the die mechanism 60. Accordingly a surplus of wire at least equal to and preferably slightly exceeding the amount fed during each feed stroke between the drum 48 and the feeding table 9 is afforded.

Since the average speed of the feeding stroke is substantially twice that at which the wire 11 is drawn from the die mechanism 60, the surplus of wire 11 between the drum 48 and the feeding table 9 at the beginning of the feeding stroke should be approximately equal to the feeding stroke. Immediately upon the conclusion of the feeding stroke, the wire 11 between the drum 48 and feeding table 9 begins to accumulate. Preferably there is an initial accumulation or excess of wire 11 so as to afford a margin of safety.

Before the apparatus is started, the wire 11 is threaded between the various guide rolls 10 and between the clutch rollers 28 and the anvil 13. This is done by pressing the rear arm 35 of the spring 29 forward so as to free the rollers and allow the wire to pass the same. Then the spring arm is released, rendering the clutch operative.

Unless the surplus wire 11 is held taut as it leaves the large drum 48, there will be insufficient friction about said drum so that the drum will slip and fail to draw the wire through the smaller die and hence fail to supply the needs of the fabricating device. To avoid undesired slippage, one form of the invention affords tensioning means in the form of a spring 61 carried by the frame A and having a free end formed as a loop 62 through which the slack wire 11 between the larger drum 48 and feed table 9 is threaded. The spring urges the loop upward so as to form substantially a bow in the slack wire. The spring is arranged to exert pressure on the slack wire at all times, notwithstanding the rapidity of oscillation or whipping of the wire to such an extent that said wire is continuously under sufficient tension to insure against any slippage of the wire around the larger drum 48, thus insuring an uninterrupted supply of wire to be fed by the table 9, and kinking of the wire as its slack is increased by the drum 48 is prevented.

The clutch mechanism 12 in its feed stroke is resisted substantially only by the spring 61. While the pressure of the spring 61 is sufficient to insure against slippage of wire on the drum 48, it is nevertheless designed to yield readily to the pull of the clutch mechanism.

The drawing mechanism may be employed with a fabricating device which feeds continuously rather than intermittently, as in wire fence and bale tie making, for example.

The wire between the larger drum 48 and the guide member 40 on the feed table and the spring loop 62 may if desired be disposed substantially in the plane of the departing turn of wire on said drum.

During the drawing operation, the wire becomes heated considerably above room temperature, and in substantially the same condition is operated upon by the fabricating device. In one embodiment of the invention which has been built wherein rod stock has been drawn to provide 8 penny nails, the wire was heated to a temperature of about 200° F. This temperature will of course vary with the kind and amount of drawing performed. At the increased temperature, the metal is softened to such an extent as to flow more readily as it is operated upon by the nail heading or other means causing flow of the metal, thus materially prolonging the life of the dies. After completion of the nails, they are of suitable hardness to perform their intended function.

Wire used in the making of wire fencing, bale ties and the like, is annealed so as to lend itself readily to twisting and bending operations. The process of annealing involves heating the wire to a temperature of about 1600° F. By employing the invention, the heat imparted to the wire in the drawing thereof may be used by passing the wire directly into the annealing furnace, thus saving an appreciable amount of heat energy which it would otherwise be necessary to supply to heat the wire to the desired annealing temperature.

It will be appreciated that the invention may be employed to operate upon wire or the like of any suitable cross-section, be it round, elliptical, angular or otherwise. The invention is also applicable to automatic screw machines and in the manufacture of bolts, rivets, pins and other products.

It is to be noted that the middle guide roller or sheave 10 is mounted on a base 10a which is adjustable in the guideway 10b toward and away from the wire 11 to accommodate wires of different sizes and to insure proper guiding of the wire to the forward sheave 10. The middle sheave is held in adjusted position by the adjusting means 10c.

The number and sizes of drums and of dies may be varied as desired. Where more than two drums are employed, the sizes thereof and of the cooperating dies may be readily computed in accordance with the desired output, the volume output at each die being the same, any variations in dimensions being compensated for by the sheave 52 and associated structure as described above, and one such structure being employed between each drum and the succeeding die.

Where only one drum and one die are employed, as for example in connection with an intermittent feed such as that described and illustrated, a wire slack take-up means such as the spring 61 may be used for the purpose described above, so that there may be no slippage of the drum relative to the wire wound thereon, and hence no interruption in the supply of wire from the drum.

The common drive for the entire apparatus insures that after the apparatus has stopped, it will upon restarting continue processing the wire directly from the point at which it stopped, without requiring any adjustment, just as though the apparatus had not stopped at all.

In the event it is desired to supply a plurality of drawn wires simultaneously, a corresponding number of drums may be driven from the shaft 1, the power being of course correspondingly increased.

The spring 61 is constructed to be responsive to the whipping of the wire 11 by the feeding device so as to constantly engage and tension the slack wire regardless of the rapidity of such whipping.

It is to be appreciated that the mechanisms could be separately driven so long as they are operated in synchronism so that the wire is consumed at the same rate at which it issues from the drawing mechanism.

In Figures 6, 7 and 8 a modified means is illustrated for the purpose of properly conducting the drawn wire from the last or larger drum to the feeding mechanism. To this end, a bracket 63 is bolted at 64 or otherwise suitably secured to the frame at any suitable point such as adjacent the smaller die 60, providing a bearing at 65 for a short shaft 66 whose axis is preferably parallel to the axis of the larger drum 48. The roll 67 is drivably connected to the drum shaft 46 by a chain and sprocket structure designated generally at 68, and including a sprocket 69 on said shaft 46 and a sprocket 70 on said shaft 66. A second short shaft 71 is carried by the bracket 63 in superimposed relation to the shaft 66 and floatingly carries a roll 72 preferably spring pressed downwardly and arranged to rest on and therefore be rotated by the roll 67. The wire 11 issuing from the larger drum 48 is arranged to pass between the rolls 67 and 72 so that, as the drum continues to rotate, it causes continued rotation of the lower roll 67 by means of the chain and sprocket structure, the pressure of the upper roll 72 being sufficient to cause the same and the roll 67 to grip the wire on opposite sides and constantly pull the wire from the drum 48. This pull enables the drum 48 to draw wire from the smaller die 60 without slippage of the wire about the drum 48.

To the end that the wire coming from the rolls 67 and 72 may be properly conducted to the feeding table 9, the bracket 63 carries a forked extension 73 which slidably receives and supports a wire guide sleeve 74. The interior of the sleeve 74 is flared rearwardly at 75 to guide and receive the wire 11 as it issues from between the rolls 67 and 72. A forked extension 76 preferably carried by the frame is formed to similarly support a second and forward guide sleeve 77 whose forward end is interiorly flared at 78.

The guide sleeve 74 is countersunk at its forward end as at 79 and the forward guide sleeve 77 is similarly countersunk at its rear end as at 80 to receive the respective ends of a coil spring 81. The ends of the spring 81 are preferably securely fixed in said countersunk portions as by brazing, welding, bolts, rivets or other suitable means, and the spring 81 forms with the guides 74 and 77 a continuous guiding and enveloping means whereby the wire issuing from the rolls 67 and 72 is delivered to the guide member 40 and rolls of the feeding table 9.

It will be seen that as the table 9 moves in its feeding and return strokes, the spring 81 is alternately straightened and bowed down. When there is slack in the wire between the rolls 67 and 72 and the feeding table 9, the spring 81 will bow downwardly due to its weight and expansibility and the slack wire fed thereinto by the rolls, notwithstanding the rapidity with which such wire slackens and tightens, so as to prevent kinking of the slacked wire and to prevent excessive whipping thereof. In the event any adjustment is necessary such as that which may be occasioned by breakage of the wire, the guides 74 and 77 may be readily removed from their holders 73 and 76, respectively.

A modified drive structure for the drawing and fabricating mechanisms is shown in Figures 9 and 10. In this structure, the drive gear 3 is mounted on a shaft 1a which is extended laterally so that its outer end is carried in a bearing 82. Mounted on the shaft 1a in spaced relation to the gear 3 and adjacent the bearing 82 is a drive pulley 83 with which the shaft 1a rotates.

Opposed friction drive cone elements 84, slidable toward and away from each other, are mounted on the shaft 1a to rotate therewith. The elements 84 are provided with hubs 85 which are loosely received in collars 86, the hubs carrying collar retaining rings 85a.

The drawing mechanism framework is somewhat modified over that of Figures 1 and 2 so as to provide space for the positioning of the gears 43 and 44 closer to the drum gear 45 and so that the gear 44a for driving the gear 45 is more closely adjacent the gear 44 with which it rotates. The modified portion B of the framework provides, in spaced relation to the gears 44 and 43, bearings for the extended portions of the respective shafts 46 and 43a, as at 87 and 88.

An arm 89 is swingably carried on an extension of the bearing 88 as at 90 in coaxial relation to the shaft 43a and provides an adjustable support for the gears 44 and 44a. The gear 44 being mounted on the arm 89 and the latter being swingable about the axis of the shaft 43a, it is clear that the gears 43 and 44 will mesh regardless of the adjustment of the arm 89. Thus the gear 44a which, with the gear 44, is mounted on the arm 89 may, when the arm 89 is swung down from the position shown in Figure 10, be replaced by another gear either of the same size in the event the gear 44a is to be repaired or is no longer serviceable, or by another gear of different size when it is desired to draw wire at different rates of speed. The arm 89 is held in any desired adjustment by bolt means 91 threaded into a part of the frame portion B and extending loosely through an arcuate slot 91a in an extended part of the arm 89. When the bolt 91 is tightened, it tightly grips the arm 89 on one side and causes said arm to be gripped on the other side by the frame portion B.

The shaft 43a is extended in the same direction as the extension of the shaft 1a and likewise is journalled at its outer end in a bearing 92 and carries for rotation therewith but slidable relative thereto opposed friction cone driving elements 84a. The elements 84a are provided with hubs of similar construction to the hubs 85 and receive collars 86a which cooperate therewith in the manner in which the collars 86 cooperate with the hubs 85.

The sets 84 and 84a of cone elements are drivably connected together by a belt 93 provided interiorly with frusto-pyramidal driving elements 94 formed so as to be contiguous when passing about the elements 84 and 84a and to be slightly spaced at their inner edges when extending between said sets of cone elements.

A pair of levers 95 are pivotally connected to the collars 86 and 86a so as to straddle the sets of cone elements 84 and 84a, and are extended beyond the sets of cone elements 84a so as to terminate in swivel nuts 96 threadedly receiving oppositely threaded portions 97 of an adjusting member 98. One end of the adjusting member 98 is formed with sides as at 99 for the reception of a wrench for conveniently rotating the element 98.

A cross bar 100 is arranged between the sets of cone elements 84 and 84a and is pivotally connected to the respective levers 95 at 101.

From the foregoing it will be seen that, for example, when the adjusting member 98 is rotated so as to draw the cone elements 84a toward each other, due to pivotal movement of the levers 95 about the pivots 101 with the cross bar 100, said levers will cause the cone elements 88 to draw farther apart, the belt 93 correspondingly engaging radially outer parts of the cone elements 84a and radially inner parts of the cone elements 84. The pivotal connections of the levers 95 with the collars 86, 86a and nuts 96 are sufficiently loose to permit the desired relative pivotal movement.

The mechanisms for drawing and fabricating the wire are preferably operated so that the wire is fed to the fabricating mechanism at the same rate at which it issues from the drawing mechanism. Should the drawing mechanism for any reason produce drawn wire at a greater rate than it is being consumed by the fabricating mechanism, the adjusting element 98 may be rotated so as to draw the cone elements 84 apart and simultaneously cause the cone elements 84a to approach each other, so as to reduce the speed of the drawing mechanism to the desired degree in relation to the speed of operation of the fabricating mechanism. Likewise, in the event the drawing mechanism tends to fall behind the fabricating mechanism, the adjusting member 98 may be rotated in a direction to increase the speed of the drawing mechanism to the desired extent.

This adjusting mechanism is capable of making very slight changes in operating speed of the drawing mechanism. When it is desired to make nails or other articles requiring, for example, a greater length of drawn wire, the pitman 38 may be adjusted in the slot 36a of the crank disc 36 so as to cause the table 9 to have a feed stroke of the desired length. For this purpose, also, the gear 44a is replaced by a larger gear. It may not be feasible to obtain such a larger gear which will increase the speed of operation of the drawing mechanism to compensate exactly for the increased stroke of the table 9. Such differences in speed as may occur between the drawing and fabricating mechanisms are therefore readily compensated for by the adjusting means including the adjusting member 98. Like differences in speed resulting from reduction of the feeding stroke or from any other cause may be readily compensated for by rotation of the adjusting member 98 in the proper direction.

The adjusting member 98 and associated mechanism are arranged so that the person operating the member 98 is in a position to view the feeding of the wire and thereby readily discern whether and to what extent adjustment is necessary.

The term "fabrication" and derivatives thereof as employed herein is to be understood as including any suitable operation which may be performed upon drawn material resulting from the practice of the invention. Thus while the invention has been described and illustrated by way of example as including or in connection with a nail making machine, it is in its broad aspect an invention having to do broadly with the performance of any suitable act upon or processing the drawn material which has been fed, such as galvanizing or other coating, cutting, pinching, upsetting, etc.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an apparatus of the class described, wire drawing mechanism, means for performing a fabricating operation upon the drawn wire, means for feeding the drawn wire from said mechanism to the first means, said mechanism and feeding means being operative to afford an accumulation of wire therebetween, and means for maintaining the wire leaving said mechanism under tension.

2. In an apparatus of the class described, wire drawing mechanism, means for performing a fabricating operation upon the drawn wire, means for operating said mechanism substantially without interruption, means for feeding wire drawn by said mechanism to the first means, said mechanism and feeding means being operative to afford an accumulation of drawn wire therebetween, and means for maintaining the drawn wire leaving said mechanism under tension.

3. In an apparatus of the class described, mechanism for continuously drawing wire into a continuous strand of reduced size to be processed, mechanism for processing the drawn wire, and means operatively associated with said mechanisms to receive the drawn wire from the first mechanism and feed it to the second mechanism, the first mechanism and said means being constructed and arranged to enable slack in the strand to accumulate therebetween so that the slack wire may be fed to the processing mechanism.

4. In an apparatus of the class described, mechanism for continuously drawing wire into a continuous strand of reduced size to be processed, mechanism for processing the drawn wire, and feeding means operatively associated with said mechanisms to receive the drawn wire from the first mechanism and feed it intermittently to the second mechanism, the first mechanism and said means being constructed and arranged to enable slack in the strand to accumulate therebetween before each feeding stroke.

5. In an apparatus of the class described, mechanism for continuously drawing wire into a continuous strand of reduced size to be processed, and means for intermittently feeding from said mechanism to a processing device during its feeding stroke an amount of drawn wire equal to that drawn continuously by said mechanism between two successive feeding strokes.

6. In a machine of the class described, mechanism for drawing wire continuously to a size from which it is to be processed, means for feeding the drawn wire intermittently to a processing device, means for moving the drawn wire from said mechanism, and spring means for guiding the drawn wire from said moving means to said feeding means.

7. An apparatus of the class described including a device for intermittently treating wire, mechanism for continuously drawing wire for delivery to said device, means for intermittently feeding to said device from said mechanism during each feeding stroke an amount of drawn wire equal to that drawn by said mechanism between two successive feeding strokes, and means for tensioning the slack drawn wire accumulating between said successive feeding strokes.

8. In a machine of the class described, mechanism for drawing wire continuously to a size from which it is to be processed, means for feeding the drawn wire intermittently to a processing device, means arranged to continuously pull the drawn wire from said mechanism, and flexible means arranged to envelop and conduct the wire from the pulling means to the feeding means.

9. In a machine of the class described, mechanism for drawing wire continuously to a size from which it is to be processed, means for feeding the drawn wire intermittently to a processing device, means arranged to continuously pull the drawn wire from said mechanism, and spring means arranged to envelop and conduct the wire from the pulling means to the feeding means, said spring means being formed to extend under tension between the feeding and pulling means and into bowed form as slack in the drawn wire builds up between said feeding and pulling means and straightening out during feeding of the wire, whereby to prevent kinking and excessive whipping of the wire.

10. An apparatus of the class described including a device for intermittently treating wire, a drive shaft, mechanism for continuously drawing wire, means for feeding drawn wire intermittently from said mechanism to said device, connections between said shaft and mechanism and between said shaft and said feeding means to afford a production of a quantity of drawn wire by said mechanism equal to the quantity of the drawn wire fed intermittently by said feeding means to said device, and means for tensioning the wire accumulating between said mechanism and said means between feeding strokes.

11. In an apparatus for making products of metal or other material, mechanism for reducing stock to a predetermined cross section in an attenuated form, means for intermittently performing fabricating operations upon the reduced material, means for feeding to the first means the reduced material issuing from said mechanism, said feeding means being intermittently operative to feed a predetermined amount of said reduced material to said first means, said mechanism and first means affording an accumulation of said reduced material at all times, and means for maintaining under tension the reduced material leaving said mechanism during and between feed strokes of said feeding means.

12. In an apparatus for making products of metal or other material, mechanism for reducing stock to a predetermined cross section in an attenuated form, means for intermittently performing fabricating operations upon the reduced material, means for feeding to the first means the reduced material issuing from said mechanism, said feeding means being intermittently operative to feed a predetermined amount of said reduced material to said first means, said mechanism and first means affording an accumulation of said reduced material at all times, means for maintaining under tension the reduced material leaving said mechanism during and between feed strokes of said feeding means, and means for operating said mechanism continuously to produce the reduced material in an uninterrupted flow.

13. In a metal fabricating apparatus, mechanism for withdrawing attenuated material from a source thereof, means for intermittently performing fabricating operations upon the material, means for intermittently feeding the withdrawn material to the first means, said withdrawing means cooperating with said feeding means to afford an accumulation of the material therebetween in such amount as to provide for each entire feed stroke, whereby the material will not be jerked from said withdrawing means by said feeding means, and means for operating said withdrawing means continuously so as to build up the accumulation when said feeding means is not feeding the material.

14. In an apparatus of the class described, wire drawing mechanism, means for intermittently feeding wire from said mechanism to be processed, said mechanism and means being arranged to afford slack in the wire therebetween for supplying said means, so that said means causes whipping of the slack wire, and means for maintaining the slack wire under tension regardless of the rapidity of such whipping.

15. In a metal fabricating apparatus, mechanism for withdrawing attenuated material from a source thereof, means for intermittently performing fabricating operations upon the material, and means for intermittently feeding the withdrawn material to the first means, said withdrawing means cooperating with said feeding means to afford an accumulation of the material therebetween in such amount as to provide for each entire feed stroke, whereby the material will not be jerked from said withdrawing means by said feeding means.

16. In an apparatus of the class described, wire drawing mechanism including a drum, means for intermittently feeding wire from said drum to be processed, said drum and means being arranged to afford slack in the wire therebetween, and means for tensioning the slack wire away from the drum.

17. In a machine of the class described, wire drawing means including a pair of drums and associated dies of unequal sizes for performing successive drawing operations, the drum associated with the larger die being formed to draw a greater quantity of wire than the drum associated with the smaller die so as to substantially compensate for excess in enlargement of the smaller die due to wear, and yieldable means for absorbing shocks resulting from the draw by the second drum upon such slack as may be formed in the wire between the smaller drum and the smaller die.

18. In a machine of the class described, mechanism for drawing wire continuously to a size from which it is to be processed, means for feeding the drawn wire intermittently to a processing device, a pair of rolls for moving the drawn wire from said mechanism, and a spring arranged to envelop and conduct the wire from said rolls to said means.

19. In a machine of the class described, mechanism for drawing wire continuously to a size from which it is to be processed, means for feeding the drawn wire intermittently to a processing device, a pair of rolls for moving the drawn wire from said mechanism, and flexible means arranged to envelop and conduct the wire from said rolls to the first means.

20. In a machine of the class described, mechanism for continuously drawing wire, mechanism for intermittently processing the wire and arranged to receive the wire as it issues from said drawing mechanism, drive means connecting said mechanisms for causing them to operate in unison, said means being constructed and arranged to employ interchangeable gears to vary the speed of the drawing mechanism for processing different lengths of wire, without affecting the speed of the processing mechanism, means for adjusting the processing mechanism to accommodate different wire lengths, and instrumentalities associated with said drive means and arranged to vary the speed of the drawing mechanism to enable the processing mechanism to consume drawn wire at the same rate at which it issues from the drawing mechanism and thereby synchronize the mechanisms.

21. In an apparatus of the class described, mechanism for continuously drawing wire into a continuous strand of reduced size to be processed, mechanism for processing the drawn wire, means operatively associated with said mechanisms to receive the drawn wire from the first mechanism and feed it to the second mechanism, the first mechanism and said means being constructed and arranged to enable slack in the strand to accumulate therebetween so that the slack wire may be fed to the processing mechanism, a source of power, and connections between said source of power and said mechanisms and means for operating the same in unison.

22. An apparatus of the class described including a device for intermittently treating wire, mechanism for continuously drawing wire for delivery to said device, means for intermittently feeding to said device from said mechanism during each feeding stroke an amount of drawn wire equal to that drawn by said mechanism between two successive feeding strokes, and means operatively connected to and affording a common drive for said mechanism and feeding means.

23. An apparatus of the class described including intermittently operative wire treating means, a device for feeding wire to said means, means for reciprocating said device so as to enable the device to intermittently feed a length of wire to said treating means, a wire drawing mechanism including a continuously rotating wire drawing drum, and connections between said device and said mechanism and constructed and arranged to afford a feed of the drawn wire leaving the drum equal to the mean feeding speed of said feeding device during a cycle thereof.

24. An apparatus for continuously forming forged metal articles from attenuated metal stock including, in combination, a reducing die and a forming die, a steadily operating means for advancing stock through said reducing die, an intermittently operating means for advancing stock through said forming die, and an accumulator associated with said steadily operating advancing means for receiving the stock at a constant rate therefrom, said accumulator being constructed and arranged to deliver said stock to said intermittently operating advancing means at recurrent intervals without affecting the steady advancement of stock through said reducing die.

ALBERT F. BRADLEY.